Feb. 2, 1943.   R. W. JOHNSON   2,309,770
CONSTANT LEVEL DEVICE
Filed Feb. 3, 1940   2 Sheets-Sheet 1
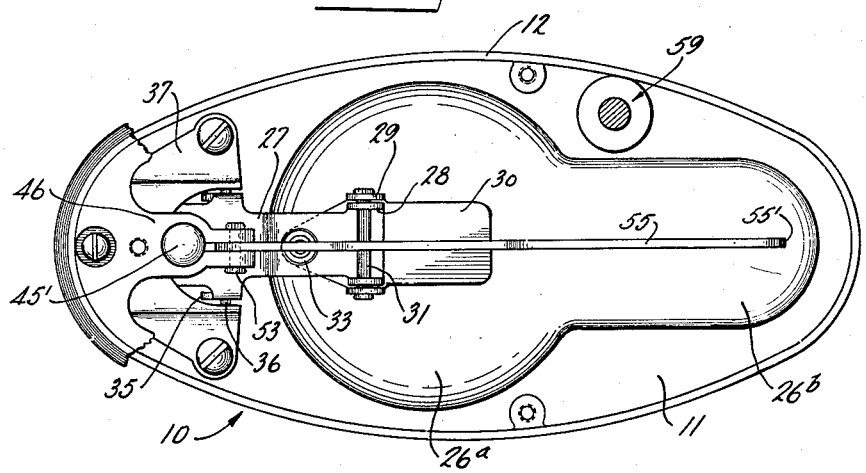
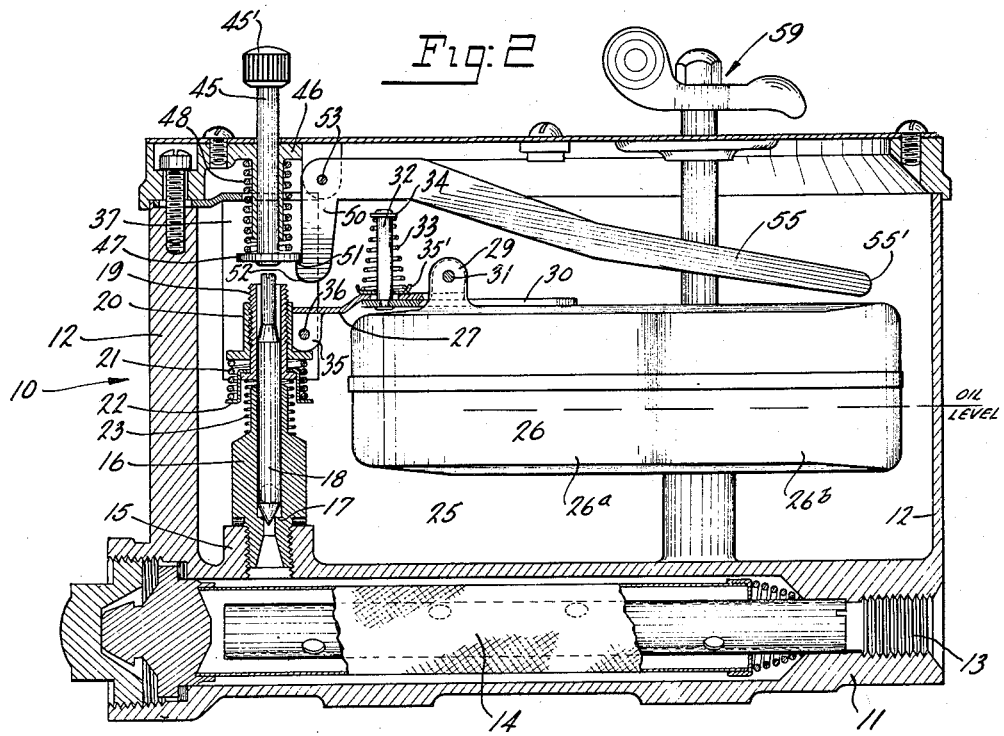
INVENTOR.
Roy W. Johnson
BY John W. Michael
ATTORNEY.

Feb. 2, 1943.  R. W. JOHNSON  2,309,770
CONSTANT LEVEL DEVICE
Filed Feb. 3, 1940   2 Sheets-Sheet 2
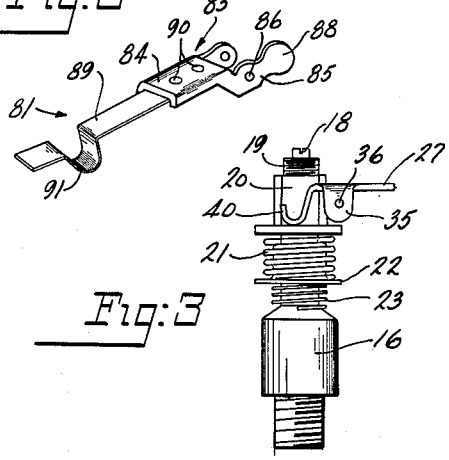
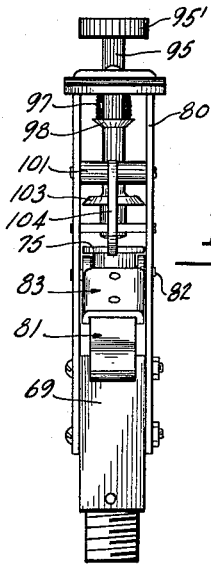
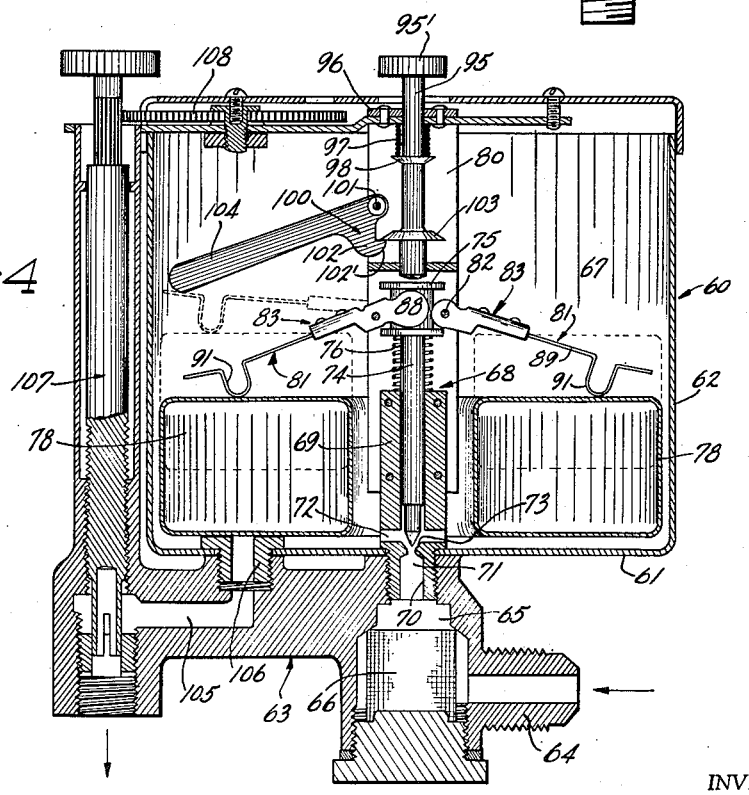
INVENTOR.
Roy W. Johnson
BY John W. Michael
ATTORNEY.

Patented Feb. 2, 1943

2,309,770

UNITED STATES PATENT OFFICE 2,309,770

CONSTANT LEVEL DEVICE

Roy W. Johnson, Milwaukee, Wis.

Application February 3, 1940, Serial No. 317,062

3 Claims. (Cl. 137—68)

This invention relates to constant level devices of the type equipped with safety cut-off mechanism and commonly employed in the oil control devices interposed between the reservoir and the burner of a gravity fed oil burning heater to provide for a metered flow of oil to the burner under a fixed or constant head.

Devices of this character usually comprise a casing having a liquid supply chamber provided with an inlet. An inlet valve regulates flow through the inlet and a float, suitably fulcrumed in the casing, cooperates with the valve to maintain a predetermined or selected liquid level in the chamber. Various types of safety cut-off mechanisms have been proposed to insure shutting off of the supply of fuel to the liquid supply chamber in the event the float controlled inlet valve fails to perform effectively its normal function and the liquid continues to rise in the supply chamber above the predetermined or selected level.

The present invention is concerned with that type of safety cut-off mechanism in which a cut-off member, such as a lever or plunger, overlies the inlet valve and is biased by weight or by spring, or both, to punch the inlet valve closed, but is latched in idle or inoperative position as long as the float-controlled inlet valve continues to function effectively. Devices of this type, as heretofore proposed, have employed a separate or second float to trip the latch upon abnormal rise of the liquid in the chamber, the second float being disposed in the supply chamber at the proper distance above the selected or predetermined liquid level therein, or being disposed in an overflow chamber provided therefor adjacent the supply chamber, the second float in either event being operatively interconnected with the latch so as to release the same when buoyed up.

The present invention proposes to so construct and organize a device of this character that a single float need be employed, the float normally controlling the inlet valve to maintain the selected or predetermined constant level in the liquid supply chamber but being effective upon abnormal rise of the liquid in said chamber to trip the latch of the safety cut-off mechanism whereupon said mechanism punches the inlet valve to closed position.

Generally speaking, the present invention accomplishes this purpose by providing a yieldable or elastic interconnection between the float and the inlet valve, the connection being sufficiently positive to enable the float to control the valve in the usual way ordinarily but yielding upon abnormal rise of the liquid in the chamber to allow the float to partake of increased upward movement and actuate the overlying trip for the latch.

The invention has the advantage of simplifying and compacting the structure, minimizing the number of parts that must be employed, and hence rendering the device easier and less expensive to manufacture.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view in top plan showing one type of constant level device embodying the present invention, the cover of the device being almost entirely broken away for the sake of illustration.

Figure 2 is a view partly in side elevation and partly in central, vertical, longitudinal cross section, further illustrating the constant level device shown in Figure 1.

Figure 3 is a detail view in elevation illustrating the manner in which the lever between the float and the inlet valve coacts with the valve.

Figure 4 is a view partly in side elevation and partly in central, vertical, longitudinal cross section showing another embodiment of the constant level device constructed in accordance with the present invention.

Figure 5 is a detail perspective view of one of the levers employed between the float and the valve in the form of the invention shown in Figure 4; and Figure 6 is a detailed view in elevation illustrating the inlet valve, lever latch, and safety cut-off member desirably employed in the construction illustrated in Figure 4.

Referring to the drawings, and more especially to Figures 1, 2, and 3, it will be seen that in the embodiment of the invention there illustrated the constant level device comprises a casing, designated generally at 10, generally elliptical in shape, and having a bottom 11 and an upstanding peripheral wall 12. The casing may be conveniently constituted of a casting, and its bottom is provided with an integral inlet 13 adapted to be connected to the tank or reservoir for the liquid fuel, and equipped with a suitable strainer 14.

The bottom 11 of the casing 10 is provided with a flanged inlet opening 15 communicating with the inlet and internally threaded so as to be adapted to be connected to the valve casing 16 of the inlet valve. The valve casing 16 is suitably machined and is provided with a valve seat 17. An inlet valve 18, which may be in the form of a needle valve, is slidably fitted in the bore of the valve casing 16 and has its tapered or pointed lower end in cooperative relation to the valve seat 17. An externally threaded sleeve 19 is press-fitted on or otherwise suitably secured to the upper portion of the inlet valve 18. An internally threaded flanged collar 20 is threadedly engaged with the sleeve 19 so as to be adjustable thereon. For the purpose of releasably securing the flanged collar 20 in any selected adjustment a locking spring 21 is provided and has its upper end abutting the underside of the flange of the collar 20 and its lower end engageable with the outwardly directed flange of a spring abutment 22. The spring abutment 22 is approximately Z shape in cross section and has its upper flange engaged with an outwardly directed flange provided on the lower end of the sleeve 19 and its lower outwardly directed flange serving as a base or abutment for the lower end of the spring 21.

The valve 18 is biased to open position, and for this purpose a coil spring 23 may be employed, the spring 23 having its lower end abutting a shoulder on the valve casing and its upper end engageable with the lower flanged end of the sleeve 19.

The valve 18 regulates the flow of the liquid fuel from the inlet into the interior of the casing which provides a liquid supply chamber 25.

For the purpose of maintaining a selected or predetermined constant level in the liquid supply chamber, a float 26 is provided and is operatively interconnected with the inlet valve. For the latter purpose a float lever 27 is operatively interrelated with the float 26 and with the valve 18 in the special manner as will now be described. The lever 27 is in the form of a sheet metal stamping and is formed at one end with transversely spaced, apertured, upstanding ears 28. These ears 28, in the assembly, are disposed adjacent and alined with similar ears 29 formed as an integral part of a bracket 30, which is soldered, spot-welded, or otherwise suitably secured to the top of the float 26. A pivot pin 31 is extended through the apertures of the ears 28 and 29 so as to pivotally interconnect one end of the lever with the float. The bracket 30 has an upstanding pin or stud 32 secured thereto at its lower end. The stud 32 projects up through and beyond an opening in the lever 27. A coil spring 33 surrounds the stud 32 and has its upper end engaged with a washer or abutment 34 suitably secured to the upper end of the stud, and its lower end engaged in a spring seat 35' which bears on the lever 27. The spring 33 is under suitable compression and for all ordinary purposes provides a sufficiently positive interconnection between the lever and the float 26 to compel the lever to respond to the movements of the float, but under certain conditions, as will be hereinafter more fully pointed out, will yield to allow the float to move relative to the lever.

The lever 27 is also formed intermediate its ends with a pair of transversely alined downwardly projecting ears 35, the ears 35 also being apertured to receive a fulcrum pin 36, which is supported in a stationary bracket 37 suitably fastened to the casing. Beyond the downwardly extending ears 35 the lever 27 is formed with a yoked or bifurcated end which is constituted of generally U-shaped members 40, the rounded portions of which bear on the upper side of the flange of the collar 20, as seen in Figure 3.

With this construction, as the float responds to the changes in level in the liquid supply chamber, the lever 27 will be rocked. When it is rocked or swung in a clockwise direction upon lowering of the liquid level, the lever 27 will allow the valve 18 to open under the biasing action of its spring 23, whereas when the float is buoyed up upon rise of the level in the liquid supply chamber, the lever 27 will be rocked in a counter-clockwise direction to cause the yoked end 40 of the lever to press down on the flange of the collar 20 and move the inlet valve 18 toward its seat 17.

As indicated, the casing 10 is elongated or of elliptical form, and the float 26 is also elongated, in that it has a generally circular main portion 26a and an elongated extension 26b.

With the construction as thus far described, the float 26 ordinarily maintains a selected or predetermined constant level in the liquid supply chamber. Occasionally, however, due to the presence of grit, or for other reason, the valve 18 will fail to seat properly notwithstanding the rise of level in the liquid supply chamber, and were this not corrected the liquid level would continue to rise until the device would be flooded. This, of course, is undesirable by reason of the hazard involved, as well as for other reasons. To provide for such occurrences it is customary in the art to equip a device of this character with some form of safety cut-off mechanism. In the present instance this is accomplished by combining with the top of the casing a safety cut-off plunger 45 which is slidably interfitted with a suitable bearing 46 combined with the top of the casing. The plunger 45 is vertically disposed and directly overlies and is alined with the valve 18. Its lower end is provided with a flange or collar 47. A coil spring 48 encircles the plunger 45 and has its lower end abutting the flange 47 and its upper end abutting the under side of the bearing for the plunger. The spring 48 biases the safety cut-off plunger to operative position, or in other words it urges it to move forcibly downward to punch the valve 18 to closed position.

Ordinarily, however, the plunger 45 is latched in idle or inoperative position since at most times the float 26 exercises the desired control over the valve 18. For this purpose a latch 50 is provided and has a latching hook 51 engageable with the under side of the peripheral edge of the flange or collar 47 of the safety cut-off member. Below the hook 51 the latch is provided with a beveled or rounded nose 52. The latch is fulcrumed or pivoted on a pivot pin 53 so that it may be swung into or out of engagement with the collar or flange 47 of the safety cut-off plunger. A release arm 55 is integral with or suitably fixed to the latch. The arm 55 is elongated or of substantial length, and in fact extends within the liquid supply chamber for practically the full length of the float 26. The release arm overlies the float, and in the construction shown inclines downwardly thereto although disposed above the top of the float even when the float is buoyed up by liquid to the maximum extent to which it may be and the liquid is at its predetermined or selected level. The extreme outer end of the release arm, designated at 55', is disposed to be engaged by the outer end of the portion 26b of the float when the liquid level in the liquid supply chamber rises above the selected or predetermined level. This occurs when the inlet valve fails to shut off the flow of liquid fuel into the liquid supply chamber notwithstanding the fact that the selected or predetermined level has been attained. When this occurs the abnormal rise of the liquid in the chamber 25 will further buoy up the float, the spring 33 yielding to allow the float to respond to this abnormal rise of liquid level. Eventually the float will engage the outer end 55' of the release arm 55 so as to swing the arm 55 in a counter-clockwise direction, as viewed in Figure 2, thereby swinging the latch 50 away from the collar on the lower end of the safety cut-off member 45 and allowing the spring 48 to forcibly urge the cut-off plunger 45 downwardly and punch the valve 18 to closed position.

With this construction it will be observed that a single float performs the dual function of normally maintaining the selected or predetermined level in the liquid supply chamber and of tripping the safety cut-off mechanism when its level abnormally rises. Generally speaking, the float is rendered capable of performing these two functions by combining it in a special way with the inlet valve, namely affording a yieldable interconnection between the float and the valve.

A further advantage of the construction shown in Figures 1 and 2 is that the float in tripping the latch acts through a substantial leverage due to the length of the release arm 55 and the way it is combined with the float and latch.

Any suitable type of metering valve may be employed to control the flow of fuel from the supply chamber 25 to the burner. One such valve is diagrammatically illustrated, as at 59, but inasmuch as this construction per se forms no part of the invention, it will not be described in detail.

After the safety cut-off mechanism has functioned, the valve will remain closed until the safety cut-off mechanism is manually re-set. This may be readily accomplished by grasping the knob 45' provided at the upper end of the safety cut-off plunger 45 and pulling the plunger upwardly against the action of the spring 48. As the plunger moves upwardly, the disk 47 engages the beveled or rounded nose of the hook to cam it out of the way, and after the disk passes above the hook of the latch, the latch, due to the weight of its arm 55, will automatically swing into latching position.

In the form of the invention shown in Figures 4, 5, and 6, the constant level device comprises a generally cylindrical casing 60 having a bottom wall 61 and a substantially peripheral cylindrical wall 62. The casing is provided with a combined inlet and outlet fitting, designated generally at 63, and disposed directly beneath the bottom 61 of the casing. This fitting 63 has an inlet nipple 64 adapted to be connected to the fuel line which leads from a tank or reservoir, and has an inlet chamber 65 into which said nipple discharges, the chamber 65 being provided with a suitable strainer 66. The upper end of the inlet chamber 65 is reduced and internally threaded.

Within the liquid supply chamber 67, which the interior of the casing 60 provides, an inlet valve, indicated generally at 68, is disposed and comprises an inlet valve casing 69 having a reduced and externally threaded lower end 70 which extends through an opening in the bottom 61 of the casing, and is interthreaded with the internal threads formed on the reduced upper end of the inlet chamber 65. In this way provision is made for the mechanical connection between the fitting 63 and the casing 60 and communication is established between the inlet chamber 65 and the interior of the valve casing 69. Passages 71 and 72 in the valve casing 60 lead from the inlet chamber into the fuel supply chamber 67, and the valve casing 69 is provided with a valve seat 73 at the juncture of these passages 70 and 71. An inlet valve 74, which may be in the form of a needle valve, is slidably fitted in the bore of the valve casing 69, and has its lower pointed end cooperable with the valve seat 73. A double flanged or spool-like collar 75 is suitably fixed to the upper end of the valve 74. A spring 76 encircles the valve 74 upon the upper end of its valve casing 69 and the lower flange of said collar 75, and is under sufficient compressions to bias the valve 74 to open position.

For the purpose of maintaining a selected or predetermined level in the liquid supply chamber 67, an annular or "doughnut" type float, designated at 78, is provided in the chamber 67 and surrounds the inlet valve 68. An inverted U-shaped bracket 80 is provided and has its legs extending down through the central opening of the float 78 and is suitably attached to opposite sides of the valve casing. A pair of lever arms, designated at 81, are pivotally mounted or fulcrumed, as at 82, on the legs of this bracket 80. These levers are of identical construction and each comprises a substantially rigid sheet metal stamping 83 having a channel-shaped body portion 84. The side flanges of the channel-spaced body portion 84 have integral offset extensions 85, transversely alined portions of which are apertured as at 86 to provide for the fulcruming or pivotal mounting of the lever. The extremities of the extensions 85 are of rounded formation, as indicated at 88, to adapt them to bear against the flanges of the spool 75. Each lever construction is completed by provision of a spring finger or arm 89 which consists of a suitably resilient strip of spring steel having one end seated in the channel-shaped body 84 of the stamping and riveted through as at 90. The outer end of each spring finger 89 is formed with a substantially U-shaped bight or bend 91, the rounded bottom of which bears against the top of the float 78 in the assembly. With this construction, as the level of the liquid in its chamber 67 rises, the float 78 is buoyed up and presses upwardly against the bends 91 of the levers to cause the levers to swing at their fulcrums and move the valve toward closed position. When the level in the supply chamber 67 falls the float drops with it, allowing the levers 81 to move downwardly and permitting the spring 76 to open the valve.

In this form of the invention the safety cut-off mechanism is also shown as comprising a plunger 95 slidably mounted in a bearing 96 provided therefor in the upper end of the bracket 80 and biased to move downwardly and punch the valve toward closed position by virtue of the action of a spring 97 encircling a portion of the plunger and having its upper end bearing against the under side of the bracket 80 and its lower end bearing against a collar 98 formed on the plunger. Normally, however, the safety cut-off plunger 95 is latched in its upper or idle position by means of a latch 100, which is fulcrumed at 101 on the bracket, and which has a latching hook 102 adapted to have latching engagement with a collar 103 formed integral with or rigidly fixed to the lower portion of the safety cut-off plunger 95. Beneath the locking shoulder of the hook 102, the latch is rounded or formed with a camming nose 102' to provide for re-setting. The latch is provided with an integral arm 104 which serves to bias the latch to latching position and also functions as a release arm.

The parts are so arranged and combined that the release arm 104 of the latch 100 overlies one of the float levers 81, but it is disposed above the plane occupied by such lever when the float is buoyed up by the liquid when the liquid is at the selected or predetermined level. If, however, the valve 74 fails to properly function, and the liquid level rises above the selected or predetermined level, then further upward movement of the float levers will occur and will result in one of the levers 81 pressing up on the outer end of the release arm 104 to trip the latch 102 and allow the safety cut-off plunger 95 to punch the valve 74 closed. This further upward movement of the float upon abnormal rise of the liquid level in the supply chamber is possible due to the fact that the arms 89 may bend or flex to allow the float to partake of such additional movement. The combined inlet and outlet fitting 63 is also provided with an outlet passage 105 connected to the interior of the casing or supply chamber 67 by a flanged fitting 106. The outlet is equipped with a metering valve 107, but, again, as this per se forms no part of the present invention it need not be described in detail. The device is shown as having an indicator 108 geared to the upper end of the metering valve.

After the safety cut-off mechanism in the structure shown in Figures 4, 5, and 6 has been tripped, it may be manually re-set by pulling upwardly on the knob 95' provided on the upper end of the safety cut-off plunger 95 since the consequent upward movement of the plunger 95 will cause the beveled upper surface of the collar 103 to coact with the rounded under surface or camming nose 102' of the latch 102 to swing the latch out of the way, and then, after the disk 103 passes above the locking shoulder of the hook of the latch, the weight of the release arm 104 will swing the latch automatically to latching position.

While I have shown and described several constructions in which the invention may be advantageously embodied, it is to be understood that the constructions shown have been selected merely for the purpose of illustration or example and that various changes in the size, shape, and arrangement of the parts may be made without departing from the spirit of the invention or the scope of the subjoined claims.

I claim:

1. A constant level device of the character described comprising a casing having a liquid supply chamber provided with an inlet, a valve cooperable with the inlet for regulating flow therethrough, an annular float surrounding the valve, a lever fulcrumed in the casing and having an arm controllably interrelated with the valve and a yieldable arm overlying and engageable with the float whereby the float is operable normally to maintain a selected liquid level in the chamber, a safety cut-off member overlying the valve and biased to punch the same to closed position, and a latch normally retaining the cut-off member against operation and having a trip member overlying the float, said float being engageable with the trip to release said latch when the float is abnormally buoyed up by rise of level of the liquid in the chamber above the selected level, said yieldable arm of said lever permitting such action by the float.

2. A constant level device of the character described comprising a casing having a liquid supply chamber provided with an inlet, a valve having a stem and operable to control flow through said inlet, a single float in said chamber, a lever fulcrumed in said chamber having one end interconnected with said valve stem, a yieldable connection between the other end of said lever and said float permitting said float to move relative to the arm in one direction only, a safety cut-off plunger slidably mounted on said casing in axial alinement with said stem and having a portion extending outside of said chamber, a spring biased to force said plunger downwardly so as to directly contact said valve stem and force said valve to closed position, a collar on said plunger, and a latch pivoted in said chamber and having a camming nose adapted to engage with said collar to maintain said plunger in raised position, said latch being positively operable by said float when said float has risen above its normal regulating field of action, said camming nose being cooperable with said collar to permit said latch to be re-engaged therewith as said plunger is reset.

3. A constant level device of the character described comprising a casing having a liquid supply chamber provided with an inlet, a valve having a stem and operable to control flow through said inlet, a single float in said chamber yieldably interconnected with said valve and operable normally to maintain a selected liquid level in said chamber, a safety cut-off plunger slidably mounted on said casing in axial alinement with said stem and having a portion extending outside of said chamber, a spring biased to force said plunger downwardly so as to directly contact said valve stem and force said valve to closed position, a collar on said plunger, and a latch pivoted in said chamber and having a camming nose adapted to engage with said collar to maintain said plunger in raised position, said latch being positively operable by said float when said float has risen above its normal regulating field of action, said camming nose being cooperable with said collar to permit said latch to be re-engaged therewith as said plunger is reset.

ROY W. JOHNSON.